US012784355B2

(12) United States Patent
Zapletal et al.

(10) Patent No.: US 12,784,355 B2
(45) Date of Patent: Nov. 3, 2026

(54) METHOD FOR GENERATING LAND-COVER MAPS

(71) Applicant: LEICA GEOSYSTEMS AG, Heerbrugg (CH)

(72) Inventors: Jan Zapletal, Ostrava-Poruba (CZ); Martina Bekrovà, Prague (CZ)

(73) Assignee: LEICA GEOSYSTEMS AG, Heerbrugg (CH)

( * ) Notice: Subject to any disclaimer, the term of this patent is extended or adjusted under 35 U.S.C. 154(b) by 141 days.

(21) Appl. No.: 18/222,276

(22) Filed: Jul. 14, 2023

(65) Prior Publication Data

US 2024/0020924 A1 Jan. 18, 2024

(30) Foreign Application Priority Data

Jul. 15, 2022 (EP) .................................... 22185206

(51) Int. Cl.

*G06T 17/05* (2011.01)
*G06T 7/11* (2017.01)
*G06T 7/50* (2017.01)
*G06T 17/20* (2006.01)

(52) U.S. Cl.

CPC ................ *G06T 17/05* (2013.01); *G06T 7/11* (2017.01); *G06T 7/50* (2017.01); *G06T 17/20* (2013.01); *G06T 2207/10028* (2013.01); *G06T 2207/10032* (2013.01); *G06T 2207/20084* (2013.01)

(58) Field of Classification Search

CPC ...................................................... G06T 17/05
See application file for complete search history.

(56) References Cited

U.S. PATENT DOCUMENTS

| | | | | |
|---|---|---|---|---|
| 9,437,034 | B1 | 9/2016 | Wei et al. | |
| 2011/0109719 | A1 * | 5/2011 | Wilson | G06T 3/08 348/E13.001 |
| 2012/0041722 | A1 | 2/2012 | Quan et al. | |
| 2018/0113581 | A1 * | 4/2018 | Makovsky | G06F 3/0482 |

(Continued)

FOREIGN PATENT DOCUMENTS

| | | | | |
|---|---|---|---|---|
| CN | 114119897 | A * | 3/2022 | |
| CN | 114494576 | A * | 5/2022 | G06N 3/045 |

OTHER PUBLICATIONS

Machine translation of CN 114119897 A (Year: 2022).*

(Continued)

*Primary Examiner* — Ryan Mcculley
(74) *Attorney, Agent, or Firm* — Maschoff Brennan

(57) ABSTRACT

A computer-implemented method for generating land-cover maps of an area, comprising: receiving a plurality of digital input images; performing semantic segmentation in the input images, segmenting each image individually and with a plurality of semantic classes, each semantic class being related to a land-cover class from a set of land-cover classes; identifying a set of single-image probability values of one or more of the semantic classes for at least a subset of the image pixels of the respective segmented image; generating a 3D mesh of the area based on the plurality of digital input images using a structure-from-motion algorithm; projecting the sets of single-image probability values on vertices of the 3D mesh; determining a set of overall probability values of one or more of the semantic classes.

20 Claims, 8 Drawing Sheets

(56) References Cited

U.S. PATENT DOCUMENTS

| | | | | |
|---|---|---|---|---|
| 2019/0213413 | A1 | 7/2019 | Kottenstette et al. | |
| 2022/0281177 | A1* | 9/2022 | Gu | B33Y 40/00 |

OTHER PUBLICATIONS

Machine translation of CN 114494576 (Year: 2022).*
Rong, Mengqi, Shuhan Shen, and Zhanyi Hu. "3D semantic labeling of photogrammetry meshes based on active learning." 2020 25th International Conference on Pattern Recognition (ICPR). IEEE, 2021. (Year: 2021).*
Martin Herold, et al., "The spectral dimension in urban land cover mapping from high-resolution optical remote sensing data," Proceedings of the 3rd Symposium on Remote Sensing of Urban Areas, (Jun. 2002).
David Barry Hester, et al., "Per-pixel Classification of High Spatial Resolution Satellite Imagery for Urban Land-cover Mapping," Photogrammetric Engineering & Remote Sensing, vol. 74, Issue 4, pp. 463-471 (Apr. 2008).
Ronald Kemker, et al., "Algorithms for semantic segmentation of multispectral remote sensing imagery using deep earning," ISPRS Journal of Photogrammetry and Remote Sensing, vol. 145, Issue A, pp. 60-77 (Nov. 2018).
Extended European Search Report dated Dec. 20, 2022 as received in Application No. 22185206.4.
Zhang Xiaomeng: "Vegetation Land Use/Land Cover Extraction from High-Resolution Satellite Images Based on Adaptive Context Inference", China Master's Theses Full-text Database (Basic Sciences Edition), vol. 2022, Issue No. 06, pp. A008-181, Jun. 15, 2022.
Mengqi Rong et al.: "3D Semantic Labeling of Photogrammetry Meshes Based on Active Learning", 2020 25th International Conference on Pattern Recognition (ICPR), May 5, 2021.

* cited by examiner

10

20'

20

24

21

22

23

METHOD FOR GENERATING LAND-COVER MAPS

BACKGROUND

The present disclosure pertains to a computer-implemented method for automatically generating maps comprising land-cover information of an area based on a plurality of input images. In particular, a texture comprising the generated land-cover information is generated and used for texturing a three-dimensional mesh or an orthoimage of the area for providing the land-cover information, e.g. as a two-dimensional land-cover map, to a user. The land-cover information is created based on a plurality of input images and using artificial intelligence (AI).

Generating maps with land-cover information using AI—e.g. including techniques of machine learning (ML) such as deep learning and feature learning—is an established topic of research. For instance, an approach using per-pixel classification in satellite images to determine land cover is described in D. Hester et al.: "Per-pixel Classification of High Spatial Resolution Satellite Imagery for Urban Land-cover Mapping", Photogrammetric Engineering & Remote Sensing, Number 4/April 2008, pp. 463-471, American Society for Photogrammetry and Remote Sensing. Another approach is described in M. Herold et al.: "The spectral dimension in urban land cover mapping from high-resolution optical remote sensing data", Proceedings of the 3rd Symposium on Remote Sensing of Urban Areas, June 2002, Istanbul.

However, existing approaches rely on orthophotos or satellite imagery, so that the resulting land-cover information is based only on a single view (or—e.g. in the case of overlapping orthoimages—based on very similar views). Thus, disadvantageously, the land-cover information of some parts of the area may not be determined with sufficient certainty. Also, some areas may be occluded in the single view, e.g. because of objects blocking the view between a satellite or aerial camera and the ground (e.g. vegetation such as trees, mobile objects such as vehicles, or roofing such as covered walkways). In this case the land-cover information related to the ground at these areas cannot be determined directly but has to be guessed, e.g. based on the visible surrounding areas.

SUMMARY

It would be desirable to provide a method that increases the certainty in determining the land-cover information and allows directly determining the ground land cover of areas that are occluded in orthoimages.

It is therefore an object of the present disclosure to provide an improved computer-implemented method for automatically generating land-cover information of an area.

It is another object to provide such a method that allows generating the land-cover information with higher certainty.

It is another object to provide such a method that allows generating a land-cover map using the land-cover information.

At least one of these objects is achieved by the embodiments described herein.

A first aspect pertains to a computer-implemented method for generating one or more land-cover maps of an area. The method comprises the following steps that are executed in a computer system:

- receiving a plurality of digital input images, each input image imaging at least a part of the area and comprising a multitude of image pixels, each input image being captured by one of a plurality of cameras from a known position and with a known orientation relative to a common coordinate system;
- performing semantic segmentation in the input images, segmenting each image individually and with a plurality of semantic classes, each semantic class being related to a land-cover class from a set of land-cover classes; and
- identifying, in each of the segmented images and based on the semantic segmentation, a set of single-image probability values of one or more of the semantic classes for at least a subset of the image pixels of the respective segmented image.

According to the first aspect, the method further comprises:

- generating a 3D mesh of the area based on the plurality of digital input images using a structure-from-motion (SfM) algorithm;
- projecting the sets of single-image probability values of each segmented image on vertices of the 3D mesh;
- weighting the sets of single-image probability values of each segmented image based on an angle between the 3D mesh and the known orientation of the camera by which the respective input image has been captured;
- determining a set of overall probability values of one or more of the semantic classes using the weighted sets of single-image probability values; and
- assigning to at least a subset of pixels of the one or more land-cover maps one or more overall probability values of the set of overall probability values.

According to one embodiment, the method comprises

- assigning a graphical indicator, such as a colour or a brightness value, to each land-cover class of at least a subset of the land-cover classes; and
- displaying the one or more land-cover maps with the assigned graphical indicators on a screen.

In one embodiment, a plurality of different land-cover maps are generated for the same area, and the method comprises receiving a user input that comprises a selection of one of the plurality of generated land-cover maps to be displayed, and displaying the selected land-cover map on the screen. Optionally, indicators of selectable land-cover maps of the plurality of land-cover maps are displayed and the user input comprises selecting one of the selectable land-cover maps.

According to another embodiment of the method, the one or more land-cover maps comprise at least a combined land-cover map showing the most probable land-cover class for every pixel of the map.

According to yet another embodiment of the method, the one or more land-cover maps comprise at least one or more per-class land-cover maps showing the probability of one land-cover class for every pixel of the map.

According to a further embodiment of the method, the one or more land-cover maps comprise at least one 2D land-cover map that is generated based on the 3D mesh. For instance, the 2D land-cover map may be generated by rasterization of the 3D mesh to an orthographic view.

In one embodiment, for generating the 2D land-cover map, a ray is created for each pixel of said 2D land-cover map, which ray runs in vertical direction from the respective pixel through the 3D mesh, the ray crossing a surface of the 3D mesh at one or more crossing points.

In one embodiment, the area comprises 3D objects including buildings, vehicles and/or trees. In this case, the at least one 2D land-cover map may comprise:

a vision-related land-cover map showing land-cover information for those surfaces of the 3D mesh that are visible from an orthographic view; and/or a ground-related land-cover map showing land-cover information for a ground surface of the 3D mesh, e.g. including surfaces of the 3D mesh that are not visible from an orthographic view, wherein for generating the vision-related land-cover map the overall probability values of a highest crossing point of each ray are assigned to the respective pixel, and for generating the ground-related land-cover map the overall probability values of a lowest crossing point of each ray is assigned to the respective pixel.

According to another embodiment of the method, the one or more land-cover maps comprise at least one 3D model of the area, which 3D model is generated based on the 3D mesh. For instance, the 3D model is a classified mesh or point cloud, and/or shows the most probable land-cover class.

According to another embodiment, the method comprises receiving an orthoimage of the area. For instance, the pixels of the land-cover map may correspond to at least a subset of the pixels of the orthoimage. In one embodiment, the plurality of cameras is selected based on the orthoimage.

According to another embodiment of the method, the plurality of input images comprise a) one or more aerial image that are captured by one or more aerial cameras mounted at satellites, airplanes or unmanned aerial vehicles, for instance wherein at least one aerial image is an orthoimage; and b) a plurality of additional input images (for instance at least 15 additional input images) that are captured by fixedly installed cameras and/or cameras mounted on ground vehicles.

According to another embodiment, the method comprises receiving depth information and using the depth information for generating the 3D mesh. For instance, at least a subset of the cameras may be embodied as a stereo camera or as a range-imaging camera and configured to provide said depth information.

According to yet another embodiment of the method, the semantic segmentation in the input images is performed using artificial intelligence (AI) and a trained neural network, e.g. using a machine-learning, deep-learning or feature-learning algorithm. In one embodiment, the set of land-cover classes comprises at least ten land-cover classes, more particularly at least twenty land-cover classes.

According to one embodiment of the method, the weighting comprises weighting probabilities of a set of single-image probability values the higher, the more acute the angle of an image axis of the input image of the respective set of single-image probability values is relative to the 3D mesh at a surface point of the 3D mesh onto which the set of single-image probability values is projected. For instance, the weighting may comprise using the cosine of the angle.

According to another embodiment of the method, the weighting comprises assigning a confidence value to each set of single-image probability values. For instance, the weighted set of single-image probability values may be calculated by multiplying the respective set of single-image probability values and the confidence value.

A second aspect pertains to a computer system comprising a processing unit and a data storage unit, wherein the data storage unit is configured to receive and store input data, e.g. comprising input-image data, to store one or more algorithms, and to store and provide output data. The algorithms comprise at least an SfM algorithm and optionally also a machine-learning, deep-learning or feature-learning algorithm. The processing unit is configured to generate, based on the input data and using the algorithms, at least one land-cover map of an area as output data by performing the method according to the first aspect.

A third aspect pertains to a computer programme product comprising programme code which is stored on a machine-readable medium, or being embodied by an electromagnetic wave comprising a programme code segment, and having computer-executable instructions for performing, particularly when executed on a processing unit of a computer system according to the second aspect, the method according to the first aspect.

BRIEF DESCRIPTION OF THE DRAWINGS

The disclosure in the following will be described in detail by referring to exemplary embodiments that are accompanied by figures, in which.

DETAILED DESCRIPTION

Figure 1:
FIG. 1 shows an orthoimage of an area.

FIG. 1 shows an orthoimage 10 of an urban area. For instance, the orthoimage may have been produced based on images captured by means of satellite imaging or aerial photography. The imaged area comprises several buildings, roads, vehicles and vegetation.

Figure 2:
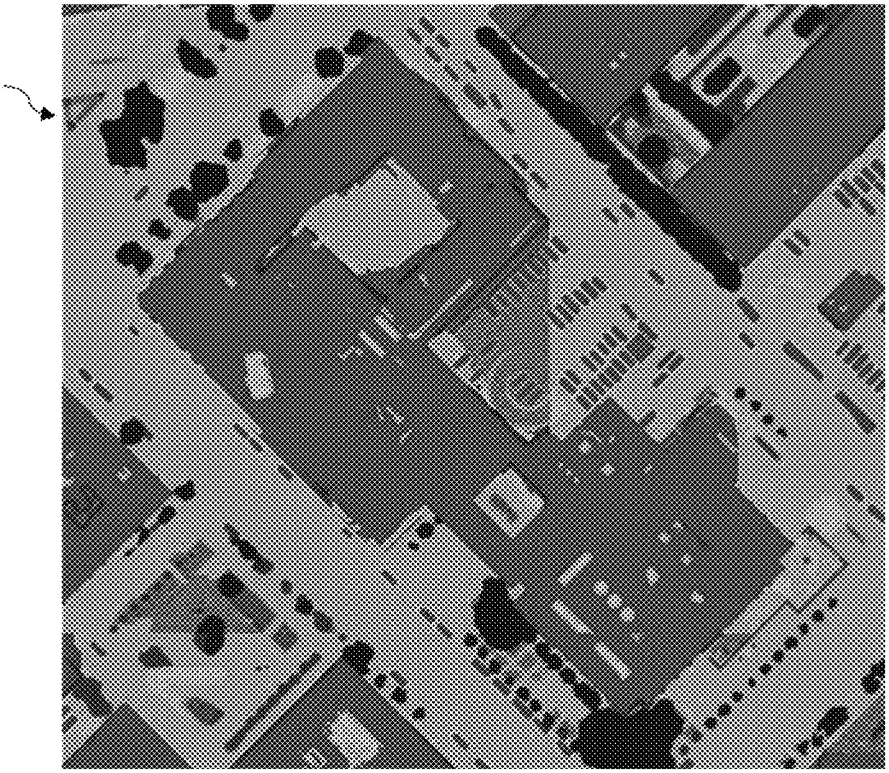
Fig. 2 (prior art)
FIG. 2 shows a land-cover map resulting from a prior art approach for generating land-cover information using the orthoimage of FIG. 1.
Figure 3:
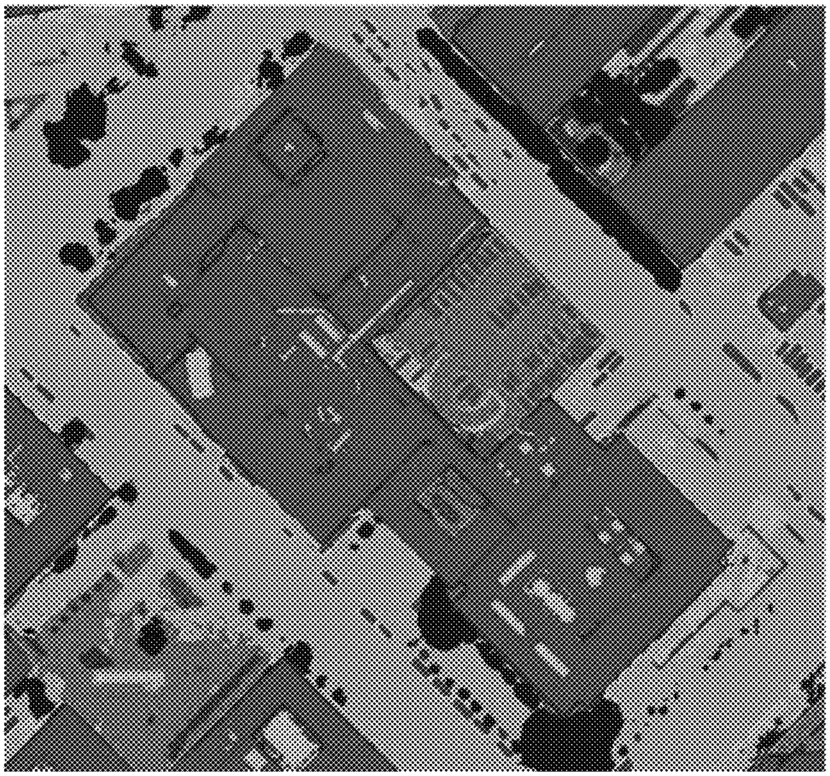
FIG. 3 shows a land-cover map resulting from an exemplary approach for generating land-cover information of the same area.

FIGS. 2 and 3 each shows a land-cover map 20, 20' of the area imaged in the orthoimage 10 of FIG. 1. For instance, land-cover information may be added to the orthoimage to generate the map 20, 20'. The land-cover information is generated by determining for each pixel of the orthoimage 10 the most probable land cover using artificial intelligence (AI).

The map 20' depicted in FIG. 2 is based on only a single view, i.e. that of the orthoimage 10 itself, so that the land-cover information of some parts of the area has not been determined correctly. For instance, relying only on orthoimages AI often misclassifies flat roofs or roof terraces as ground.

FIG. 3 shows another land-cover map 20 of the area depicted in the orthoimage 10 of FIG. 1, wherein the map 20 comprises land-cover information that is generated not only from the orthoimage but from a multitude of input images captured by a multitude of cameras from different angles and positions. In each of these images for each pixel the probabilities of all land cover classes are determined using AI. In the shown example, the produced land-cover map 20 is a combined land-cover map showing the most probable land-cover class for each pixel of the map.

Figure 4:
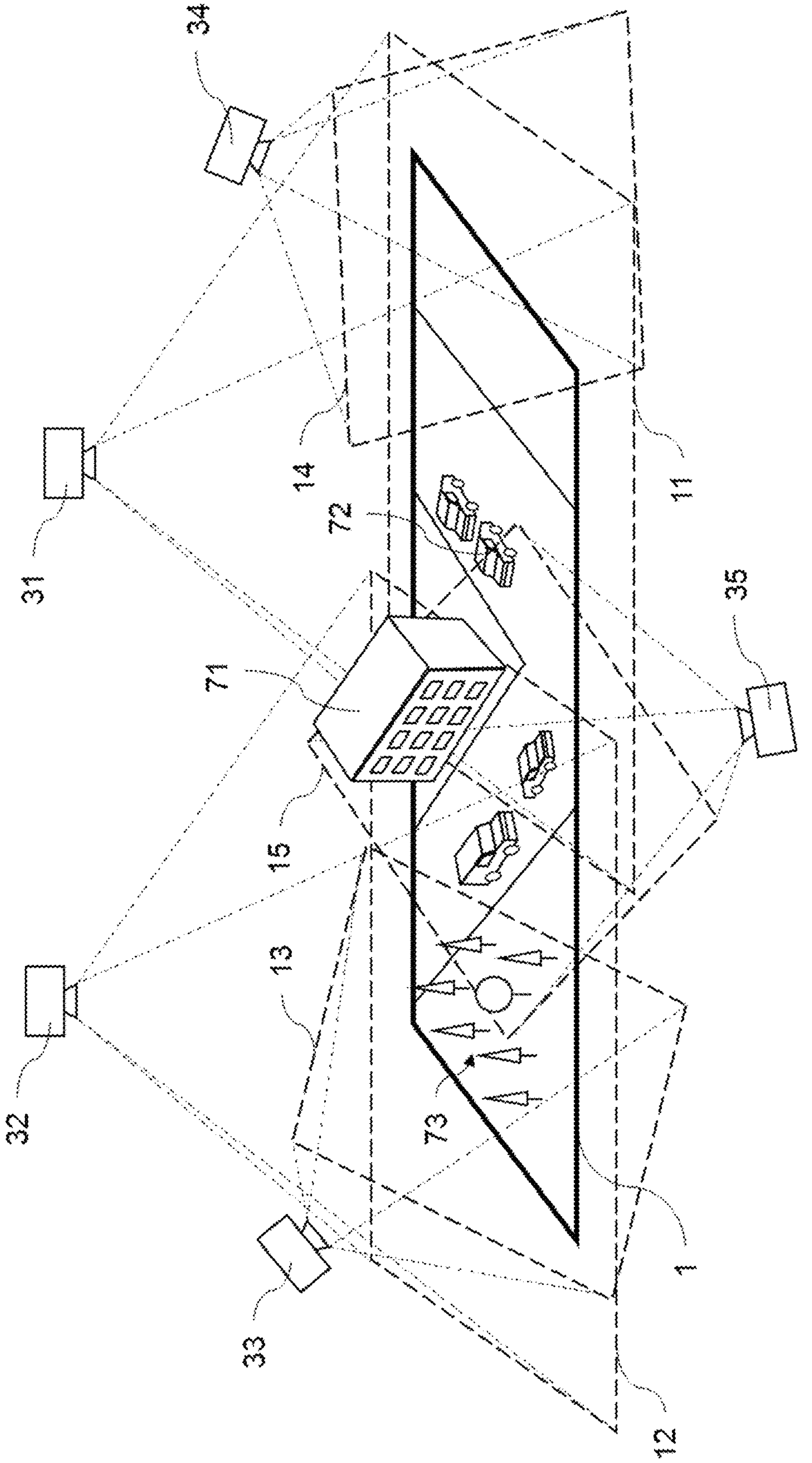
FIG. 4 shows an exemplary distribution of cameras for capturing images of an area.

FIG. 4 shows an exemplary camera distribution for capturing images of an area 1 as a source for generating the land-cover information of the area to generate land-cover maps like the map 20 of FIG. 3. The area comprises 3D objects such as buildings 71, vehicles 72 and trees 73. A single orthoimage can only produce a 2D representation of the 3D objects. Thus, a plurality of input images is used.

The cameras in FIG. 4 comprise a number of aerial cameras 31, 32 which capture digital images of the area 1 with an aerial view, i.e. nadir or oblique images—optionally comprising orthoimages. These cameras 31, 32 may be mounted on satellites, airplanes or unmanned aerial vehicles (UAV). The aerial cameras 31, 32 may capture several different aerial images 11, 12 of the same area 1 or of different parts of the same area 1 from different positions. The cameras further comprise a number of additional (i.e. non-aerial) cameras 33-35 which capture additional digital images 13-15 of parts of the area 1 from different positions. Some of these cameras may be fixedly installed in the area 1, e.g. installed on buildings 71 as surveillance cameras or for surveying traffic, others may be installed on ground vehicles 72 moving through the area 1. Preferably, the positions and orientations of the cameras 31-35 while capturing the images 11-15 is known, e.g. with respect to a common coordinate system. Alternatively, the relative positions and orientations need to be deduced from the captured images, e.g. using image overlaps and image-recognition approaches.

The input images can be captured at various locations, with different camera systems, under possibly different lightning conditions and can span a range of resolutions. For instance, the ground sample distance (GSD) in each image may vary between 2 and 15 cm. Preferably, the cameras 31-35 are calibrated, which allows easy transition between world points (points in real world) and pixels in individual images capturing the respective world point.

In some embodiments, at least a subset of the cameras 31-35 is embodied as stereo cameras or range-imaging cameras providing depth information and/or allowing feature or topography extraction. Also, data from one or more LIDAR devices or 3D laser scanners (not shown here) may be used for providing depth or range information.

This approach, using a plurality of input images, allows more robust predictions compared to predictions based on single-view orthoimages and may be divided into two main stages.

In a first stage, the input images 11-15 are segmented into several semantic classes, i.e. pre-defined land-cover classes. This stage may be run on every input image 11-15 separately and includes determining probabilities of the land-cover classes for each pixel of each input image 11-15. The segmentation may be based on publicly available neural networks trained on data processed by a computer vision pipeline. This includes using a training dataset and various data augmentation techniques during the training to ensure generality of the model. For semantic segmentation of images, publicly available up-to-date neural network architectures may be used. Suitable network architectures comprise, e.g., "Deeplab v3+" or "Hierarchical Multi-Scale Attention". Once the network is trained, every input image 11-15 is processed by pixels or tiles and segmented into desired classes.

The second stage is based on structure-from-motion (SfM) approaches combining the segmented images to generate a single 3D model (e.g. a mesh or point cloud). Optionally, generating the 3D model additionally comprises using depth or range information that is captured using 3D scanners (e.g. LIDAR), stereo cameras and/or range-imaging cameras.

The individually segmented images—together with the probabilities determined during semantic segmentation for each image—are then projected onto the 3D model, e.g. onto vertices of the 3D mesh created by SfM algorithms. The projected probabilities are weighted by the angle of impact to the mesh and averaged.

Weighting the probabilities adds a confidence factor that is based on the respective angle of the image axis relative to the surface of the 3D mesh (or other 3D model) onto which the image pixel is projected. For instance, the probabilities of a certain image pixel may be weighted the higher the more acute the impact angle of the respective image axis is relative to the mesh at that surface point of the mesh onto which said image pixel is projected. In some embodiments, this weighting comprises using the cosine of the angle. Since each impact angle is between 0° and 90°, the respective cosine values are between 1 and 0, wherein a value of 1 means the highest weighting and a value of 0 means the lowest weighting. Thus, acute angles having high cosine values are weighted higher, whereas right angles are given the lowest weight.

Using the 3D mesh, the land-cover predictions are not limited to 2D space only. This can be beneficial, for example in extraction of trees and buildings, i.e. to determine the land cover below roofs or vegetation.

Figure 5:
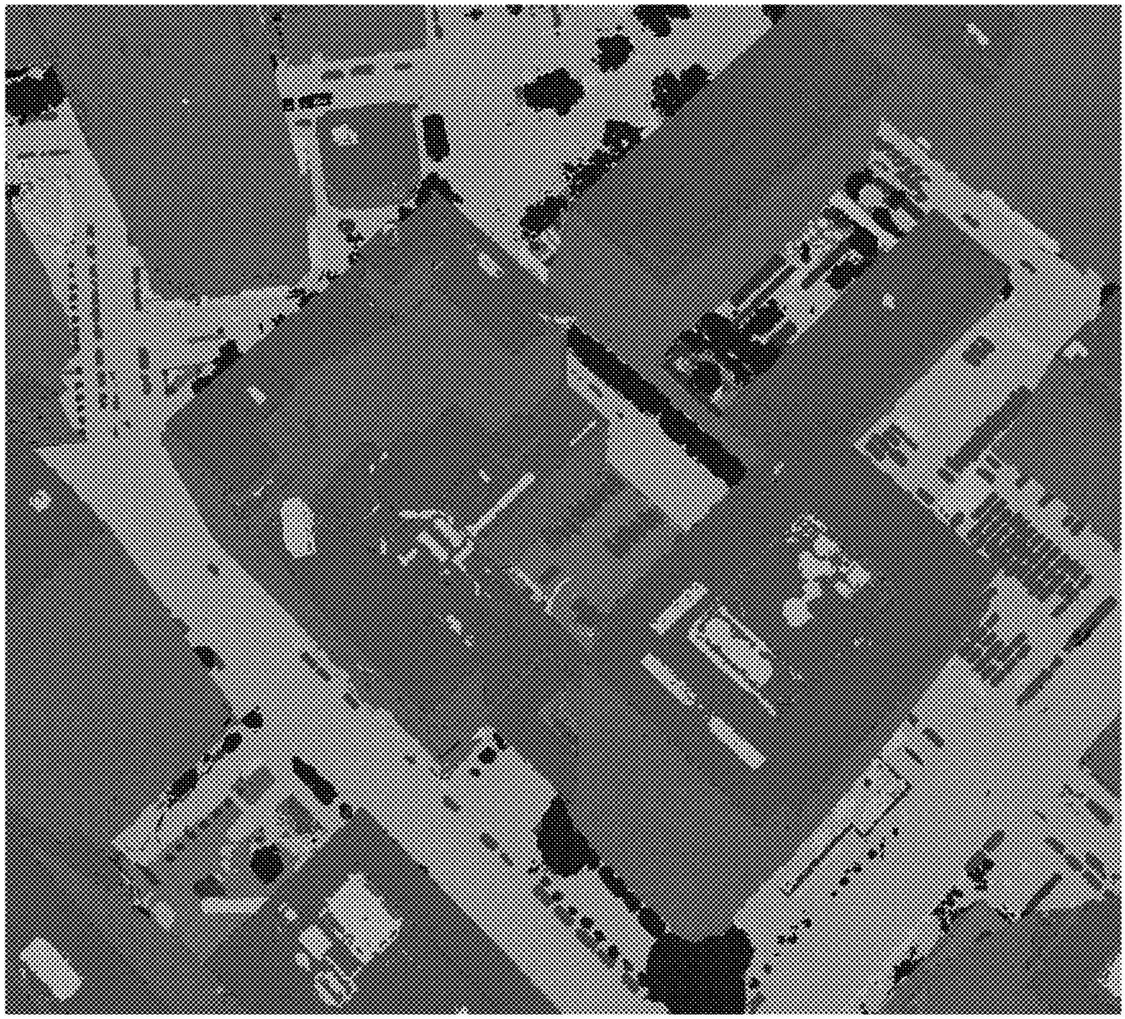
FIG. 5 shows a 3D mesh of the area of FIG. 1 comprising classified mesh vertices with land-cover information.

FIG. 5 shows a classified mesh 24 which can be generated directly from the 3D mesh and may be displayed as a 3D land-cover map on a screen to a user. Additionally or alternatively, the 3D mesh or the classified mesh 24 can be rasterized from ortho view to generate a two-dimensional (2D) raster output, e.g. the 2D land-cover map 20 of FIG. 3.

Figure 6A:
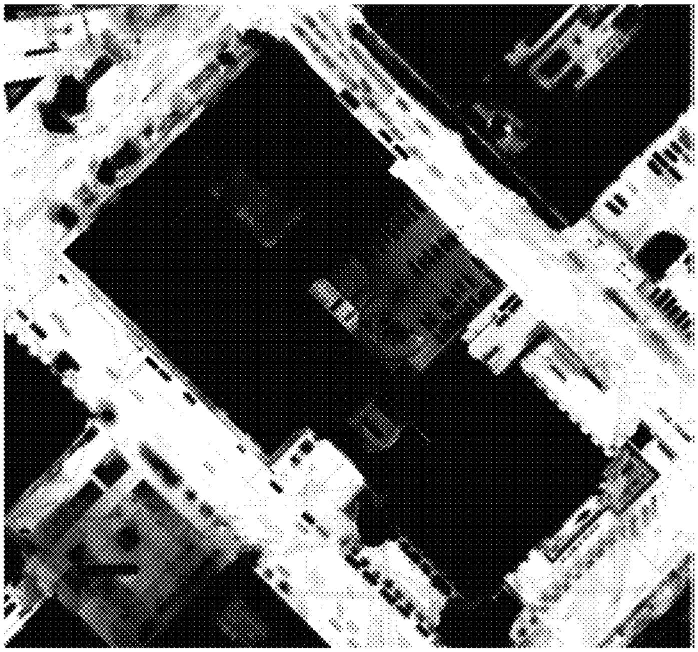
FIGS. 6*a-c* show three exemplary per-class land-cover maps of the area of FIG. 1.
Figure 6B:
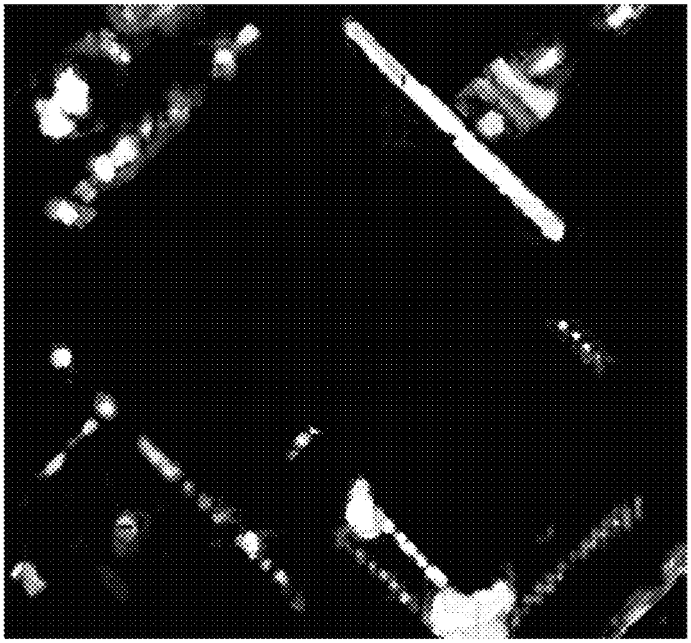
Figure 6C:
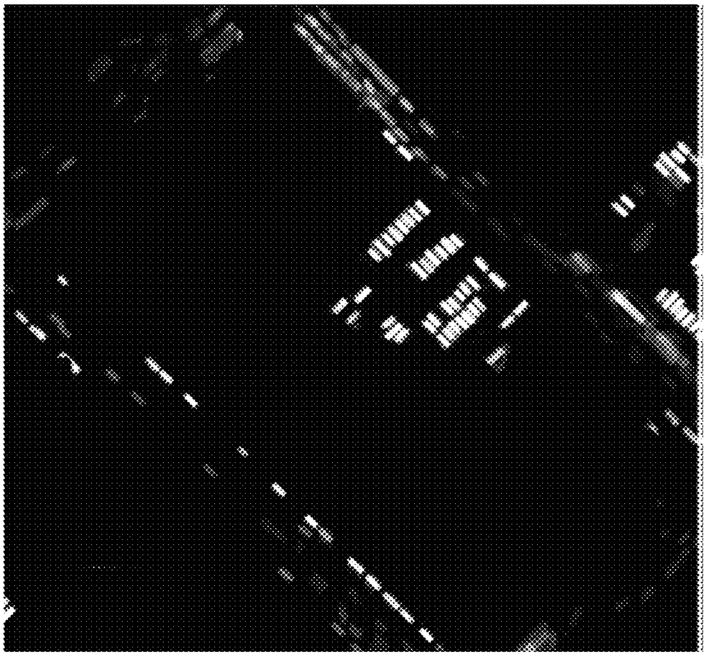

The approach allows generating and presenting to a user for instance:

- "combined land-cover maps" 20 (as shown in FIG. 3) show the most probable class for every pixel;
- "per-class land-cover maps" 21-23 (as shown in FIGS. 6*a-c*) show for every pixel the probability of a certain class;
- "classified point clouds or meshes" 24 (as shown in FIG. 5), wherein image predictions can be projected directly to a mesh or point cloud (using mesh for occlusions).

The combined land-cover maps 20 and the per-class land-cover maps 21-23 may be displayed as 2D maps, whereas the classified point clouds or meshes 24 may be displayed as 3D maps. The 2D maps may either respect the occlusions by the 3D mesh from orthographic view ("vision related"), or ignore the occlusions by the 3D mesh, thus allowing to see under trees and overhangs of buildings ("ground related"), optionally showing the highest probability through all mesh layers without occlusions from orthographic view.

For each pixel of a 2D map, a ray is created that runs in vertical direction from the respective pixel through the mesh 25. This ray thus crosses the mesh 25 at one or more points. For a vision-related (e.g. top-view) map, only the highest of those crossing points is used and the most probable class is chosen from the averaged probabilities. For a ground-related map, only the lowest of those crossing points is used and the most probable class is chosen from the averaged probabilities.

For a per-class land-cover map, the highest probability in every pixel for every land-cover class is required separately.

Thus, for every pixel the maximum probability of a given class in the crossing points may be used.

Additionally, by combining probabilities from different views, non-rigid objects such as moving cars can be identified in the scene. This information can be used to remove moving objects that cause visually unpleasing effects from the texturing. This removing of moving vehicles from a texture is disclosed in the applicant's earlier application with the application number EP21204032.3. Similarly to removing the moving objects from the texture, they may also be ignored in land-cover information, instead showing the land-cover information of the ground beneath the moving objects.

FIGS. 6*a*-*c* show three examples of a per-class land-cover map 21-23 that can be generated using a method. In these maps, only information related to a certain land-cover class is shown. In the illustrated examples, high brightness values mean high probability and low brightness values mean low probability, so that white areas have a 100% probability and black areas have a 0% probability.

These per-class land-cover maps 21-23 may be generated for each land-cover class. In FIG. 6*a*, the land-cover class shown in the map 21 is impervious ground, i.e. comprising roads, pavements, car parks etc., in FIG. 6*b*, the land-cover class shown in the map 22 is trees, and in FIG. 6*c*, the land-cover class shown in the map 23 is vehicles.

Figure 7:
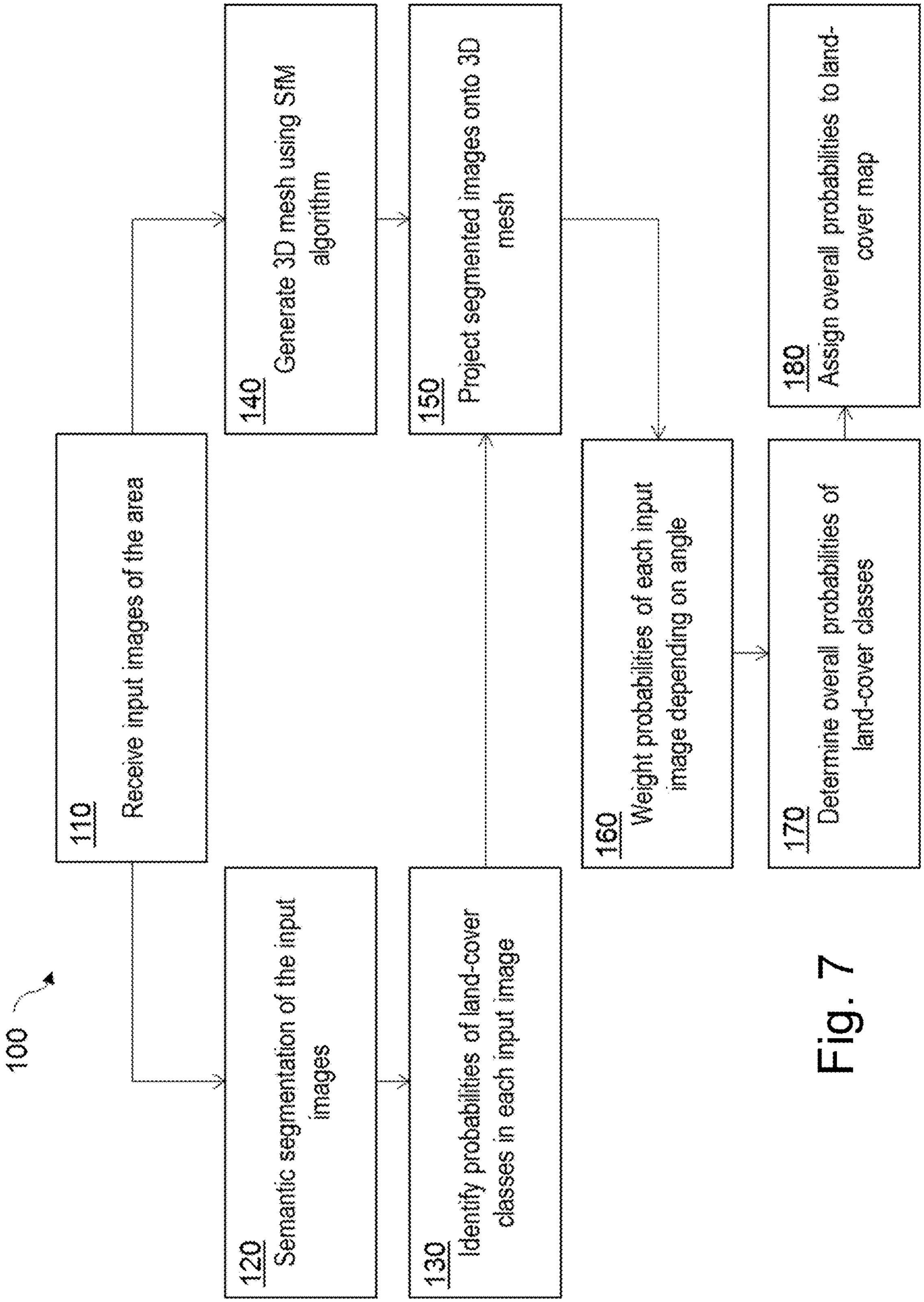
FIG. 7 shows a flow chart illustrating steps of an exemplary embodiment of a method.

FIG. 7 shows a flow chart illustrating steps of an exemplary embodiment of a method 100. In the proposed method 100, predictions of images from several views are combined in 3D space using known camera positions and a 3D mesh. This increases robustness of the resulting land cover. Ortho projection is the used to create a 2D land-cover map. This approach not only allows accurate predictions for orthographic view, but also allows classifying areas that are occluded from orthographic view.

The method starts with receiving 110 a plurality of digital input images of the area, e.g. from the cameras 31-35 shown in FIG. 4. Semantic segmentation 120 is performed in each of the input images. For instance, at least ten or twenty land-cover classes are provided that are automatically detected as semantic classes during semantic segmentation.

A number of possible land-cover classes for each pixel is detected and the probabilities of the possible land-cover classes are identified 130 for each pixel of each input image. A 3D mesh of the area is generated 140 using the input images and a structure-from-motion (SfM) algorithm. The identified probabilities are then projected 150 onto this mesh.

The probabilities provided by the single segmented images for each of their image pixels are then weighted 160 by adding a confidence factor that is based on the respective angle of the image axis relative to the mesh surface. In some embodiments, this weighting 160 comprises using the cosine of the angle. Since each angle is between 0° and 90°, the respective cosine values are between 1 and 0, wherein a value of 1 means the highest weighting and a value of 0 means the lowest weighting. Right angles are weighted the lowest and acute angles having high cosine values are weighted higher. Consequently, the probabilities of a certain image pixel are weighted the higher the more acute the angle of the respective image axis is relative to the mesh at that surface point of the mesh onto which said image pixel is projected.

After the weighting 160 of the individual probabilities, overall probabilities of all land-cover classes can be determined 170 and assigned 180 to the pixels of the resulting land-cover map.

For instance, a certain pixel of the map may be visible in three input images. Probabilities of all classes in every image are then multiplied with the angle-dependent weighting value (confidence factor) of the respective image. The resulting values (including both the probability and the confidence factor) of all images can then be used to determine the overall probabilities and assign the most probable land-cover class to the respective pixel of the land-cover map.

Colours or other graphical indicators, such as brightness values or patterns, might be assigned to the land-cover classes, and a land-cover map may be displayed to a user, wherein each pixel has the colour assigned to its most probable land-cover class. The colours may be assigned through a user input or pre-defined, e.g. assigning the colours at least partially to allow the user intuitively recognizing the land-cover class from the displayed colour. For instance, trees might be assigned a green colour, streets a grey colour etc.

Figure 8:
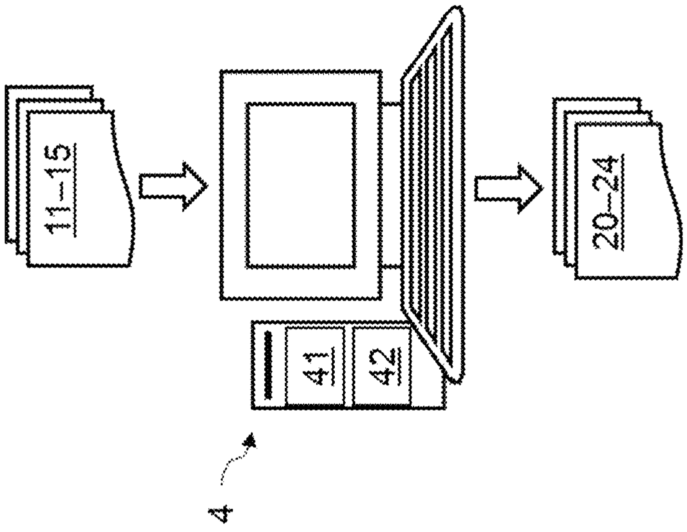
FIG. 8 shows an exemplary computer system for performing a method.

FIG. 8 illustrates an exemplary computer system for executing a method. The depicted computer 4 comprises a processing unit 41 and a storage unit 42. The storage unit 42 is configured to store algorithms for executing the method, i.e. SfM algorithms and ML algorithms. It is also configured to store received input data, generated output data and any intermediate data generated in the process. The computer 4 receives as input at least the plurality of input images 11-15 of the area and calculates and outputs one or more land-cover maps 20-24 of the area. Of course, instead of a single computer 4 as shown here, cloud computing may be used as well. The land-cover maps 20-24 may be output on a display of the computer 4, printed and/or provided to other computer systems, e.g. via an Internet connection.

Figure 9:
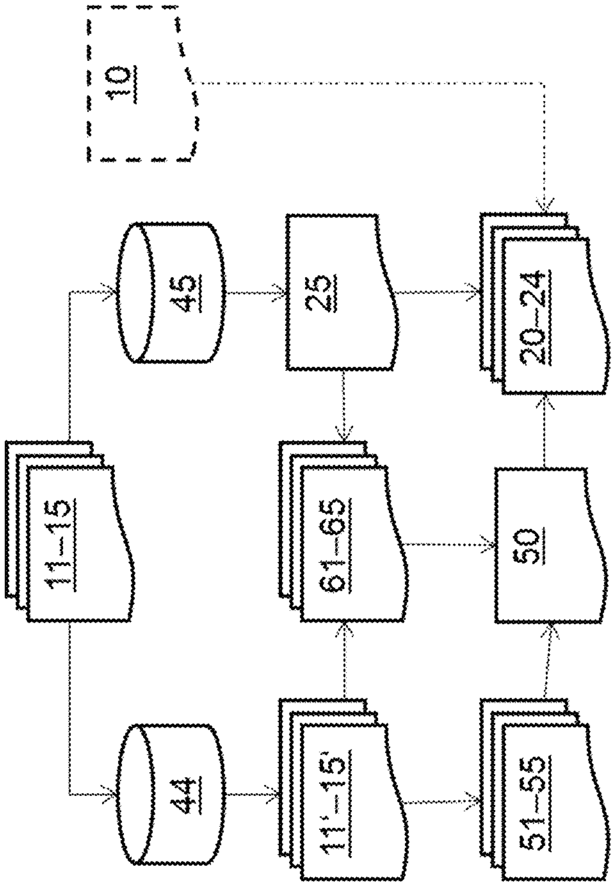
FIG. 9 illustrates generation of data within the computer system while performing an exemplary embodiment of a method.

FIG. 9 illustrates a flow of data in a computer system, e.g. the computer 4 of FIG. 8, while performing an exemplary method. An SfM algorithm 45 of the computer system generates a 3D mesh 25 using the plurality input images 11-15—and optionally additionally from available depth information or range information.

Semantic segmentation is performed for each input image 11 of the plurality of input images 11-15 using an ML algorithm 44. The resulting segmented images 11'-15' provide sets of single-image probability values 51-55, i.e. probability values for each pixel of the segmented image.

The segmented images 11'-15' are projected onto the 3D mesh 25 and confidence values 61-65 are assigned to each pixel of the segmented images 11'-15' based on the angle of the image axis of the respective projected segmented image relative to the mesh surface.

Based on the confidence values 61-65 and the sets of single-image probability values 51-55 of each pixel of each image, the probability values are averaged to receive a set of overall probability values 50 for each pixel.

The sets of overall probability values 50 are then assigned to the pixels of the land-cover map(s) 20-24, which may be generated, optionally, based on a received orthoimage 10 of the area.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A computer-implemented method for generating one or more land-cover maps of an area using semantic segmentation, the method comprising, in a computer system, receiving a plurality of digital input images, each input image imaging at least a part of the area and comprising a multitude of image pixels, each input image being captured by one of a plurality of cameras from a known position and with a known orientation relative to a common coordinate system;

performing semantic segmentation in the input images, segmenting each image individually and with a plurality of semantic classes, each semantic class being related to a land-cover class from a set of land-cover classes; and identifying, in each of the segmented images and based on the semantic segmentation, a set of single-image probability values of one or more of the semantic classes for at least a subset of the image pixels of the respective segmented image, generating a 3D mesh of the area based on the plurality of digital input images using a structure-from-motion algorithm;

projecting the sets of single-image probability values of each segmented image on vertices of the 3D mesh;

weighting the sets of single-image probability values of each segmented image based on an angle between the 3D mesh and the known orientation of the camera by which the respective input image has been captured;

determining a set of overall probability values of one or more of the semantic classes using the weighted sets of single-image probability values; and assigning to at least a subset of pixels of the one or more land-cover maps one or more overall probability values of the set of overall probability values, wherein the weighting comprises:

assigning a confidence value to each set of single-image probability values, and wherein the weighted set of single-image probability values is calculated by multiplying, for each pixel of the subset of the image pixels, the respective set of single-image probability values and the confidence value.

2. The method according to claim 1, comprising:

assigning a graphical indicator to each land-cover class of at least a subset of the land-cover classes; and displaying the one or more land-cover maps with the assigned graphical indicators on a screen.

3. The method according to claim 2, wherein:

a plurality of land-cover maps are generated for the same area, a user input is received, the user input comprising selecting one of the plurality of land-cover maps to be displayed, and the selected land-cover map is displayed.

4. The method according to claim 3, wherein indicators of selectable land-cover maps of the plurality of land-cover maps are displayed and the user input comprises selecting one of the selectable land-cover maps.

5. The method according to claim 1, wherein the one or more land-cover maps comprise at least a combined land-cover map showing the most probable land-cover class for every pixel of the map; and/or one or more per-class land-cover maps showing the probability of one land-cover class for every pixel of the map.

6. The method according to claim 1, wherein the one or more land-cover maps comprise at least one 2D land-cover map that is generated based on the 3D mesh.

7. The method according to claim 6, wherein for each pixel of the 2D land-cover map, a ray is created that runs in vertical direction from the respective pixel through the 3D mesh, the ray crossing a surface of the 3D mesh at one or more crossing points.

8. The method according to claim 7, wherein the area comprises three-dimensional objects comprising at least one of buildings, vehicles and trees, the at least one 2D land-cover map comprising at least a vision-related land-cover map showing land-cover information for those surfaces of the 3D mesh that are visible from an orthographic view; and/or a ground-related land-cover map showing land-cover information for a ground surface of the 3D mesh, wherein:

for generating the vision-related land-cover map the overall probability values of a highest crossing point of each ray are assigned to the respective pixel, and for generating the ground-related land-cover map the overall probability values of a lowest crossing point of each ray is assigned to the respective pixel.

9. The method according to claim 8, wherein a ground-related land-cover map showing land-cover information for a ground surface of the 3D mesh includes surfaces of the 3D mesh that are not visible from an orthographic view.

10. The method according to claim 6, wherein the 2D land-cover map is generated by rasterization of the 3D mesh to an orthographic view.

11. The method according to claim 1, wherein the one or more land- cover maps comprise at least one 3D model of the area that is generated based on the 3D mesh.

12. The method according to claim 11, wherein the 3D-model shows the most probable land-cover class.

13. The method according to claim 1, comprising receiving an orthoimage of the area, wherein the pixels of the land-cover map correspond at least to a subset of the pixels of the orthoimage; and/or the plurality of cameras is selected based on the orthoimage.

14. The method according to claim 1, wherein the plurality of input images comprise one or more aerial image that are captured by one or more aerial cameras mounted at satellites, airplanes or unmanned aerial vehicles; and a plurality of additional input images that are captured by fixedly installed cameras and/or cameras mounted on ground vehicles.

15. The method according to claim 1, wherein the method comprises receiving depth information and using the depth information for generating the 3D mesh.

16. The method according to claim 15, wherein at least a subset of the cameras is embodied as a stereo camera or as a range-imaging camera and configured to provide the depth information.

17. The method according to claim 1, wherein the semantic segmentation in the input images is performed using artificial intelligence and a trained neural network.

18. The method according to claim 1, wherein the weighting comprises weighting probabilities of a set of single-image probability values the higher, the more acute the angle of an image axis of the input image of the respective set of single-image probability values is relative to the 3D mesh at a surface point of the 3D mesh onto which the set of single-image probability values is projected.

19. A computer system comprising a processing unit and a data storage unit, wherein the data storage unit is configured to receive and store input data, to store one or more algorithms, and to store and provide output data, the algorithms comprising at least a structure-from-motion algorithm, wherein the processing unit is configured to generate, based on the input data and using the algorithms, at least one land-cover map of an area as output data by performing the method according to claim 1.

20. A computer program product comprising program code which is stored on a non-transitory machine-readable medium, and having computer-executable instructions for performing the method according to claim 1.

* * * * *